United States Patent [19]
Gugliotta

[11] 3,783,719
[45] Jan. 8, 1974

[54] MACHINE TOOL

[75] Inventor: Donald R. Gugliotta, Chagrin Fall, Ohio

[73] Assignee: The Warner & Swasey Company, Cleveland, Ohio

[22] Filed: Aug. 15, 1972

[21] Appl. No.: 280,870

[52] U.S. Cl. .................... 82/21 B, 82/2 B, 318/574, 408/3
[51] Int. Cl. ........................................... B23b 21/00
[58] Field of Search ...................... 82/21 B, 25, 2 B; 318/574; 408/3

[56] References Cited
UNITED STATES PATENTS
3,343,243  9/1967  Renker............................... 82/21 B
3,063,311  11/1962  Beckwith et al..................... 318/574

*Primary Examiner*—Leonidas Vlachos
*Attorney*—J. Herman Yount, Jr. et al.

[57] ABSTRACT

An improved control apparatus is utilized with a machine tool having side and end turrets. Each of the turrets is moveable along either one of two axes. This control apparatus is operable in response to command signals from a stored program or from manual data inputs to effect movement of either one of the turrets while the other turret remains parked or stationary. The control apparatus includes a single function generator and two discriminators or position error signal generators, each of which is selectably switched between one position servoloop associated with the side turret and one position servoloop associated with the end turret. Switching may be initiated either by command signals from a stored program or from manual data inputs.

11 Claims, 4 Drawing Figures

FIG. 4 dash;
MACHINE TOOL

BACKGROUND OF THE INVENTION

This invention relates generally to control apparatus and more specifically to a control apparatus which is used to selectively control either axis pair of a machine tool having two axis pairs.

Numerical controls for machine tools are generally very expensive, accounting for a substantial percentage of the total cost of a numerically controlled machine tool. This is particularly true of the more sophisticated machine tools having three, four, or more axes. One such machine tool is the four-axis turret lathe. A four-axis turret lathe has two turrets, each movable along two control axes. A four-axis control permits both turrets to be used simultaneously. This usage is generally referred to in the art as making combined cuts.

When the geometry of a workpiece requires the making of combined cuts, the relatively expensive four-axis controls are necessary to enable both turrets to be used simultaneously and are well worth their high initial cost. However, many workpieces have a geometry such that the making of combined cuts is not necessary and may even be impractical. Also, sophisticated part programming is required to coordinate the simultaneous movement of two turrets to make combined cuts.

In an effort to reduce the cost of controls for a four-axis machine, the controls have previously been designed so that either one or both of the turrets can be moved along any two of the four axes. Thus, one of the turrets could be moved along an axis extending parallel to the axis of rotation of the workpiece while the other turret is moved along an axis extending perpendicular to the axis of rotation of the workpiece. In addition, these known controls could effect movement of any one of the turrets along two axes while the other turret was stationary or parked. However, the controls for selecting any two out of four axes are relatively expensive since two function generators and four complete servoloops are used, that is, one complete servoloop for each of the four axes. In another attempt to reduce control system costs, a lathe has been provided with two turrets which are mounted on a single slide. Although this approach provides more tool stations, it has many of the tooling disadvantages of a single turret machine, such as long overhang of a turning tool.

SUMMARY OF THE PRESENT INVENTION

In order to reduce the cost of the numerical control, and at the same time preserve the versitility provided by two turrets (four axes), the present invention contemplates the use of a two-axis control which may be selectively used to control one turret at a time of a two-turret machine. By utilizing a two-axis control to selectively control either axis pair of a four axis machine tool, the present invention reduces the cost of the controls. This is accomplished by utilizing at least some of the control elements to control movement of one turret along one of its two axes and to subsequently control movement of the other turret along one of its two axes.

Specifically, the controls of the present invention include an error signal generator or discriminator which is connected in a first servoloop to control movement of a side turret along one of its two axes (for example the X-axis) and is connected in a second servoloop to control movement of an end turret along one of its two axes (for example the U-axis). When this error signal generator is switched from the servoloop controlling movement of the side turret to the servoloop controlling movement of the end turret, a second error signal generator or discriminator is switched from a servoloop for controlling movement of the side turret relative to one of its axes (the Z-axis) to a servoloop for controlling movement of the end turret relative to one of its axes (the W-axis). Since the error signal generators are simultaneously switched between servoloops associated with the side turret and servoloops associated with the end turret, only one of the two turrets are moved at a time. Although the controls of the present invention are described herein in connection with a two-turret machine tool, it is contemplated that the controls may be utilized in other environments.

Accordingly, it is an object of this invention to provide an apparatus for controlling the operation of a four-axis device with a two-axis numerical control.

Another object of this invention is to provide a new and improved apparatus which is responsive to numerical commands to select one turret of a pair of turrets for activation and to render the non-selected turret inactive so that it is held in a parked or stationary position.

Another object of this invention is to provide a new and improved machine tool having a pair of turrets or other tool supports and a control apparatus for effecting movement of only one of the turrets at a time and for preventing movement of the other turret during movement of the one turret and wherein the control apparatus includes a pair of error signal generators or discriminators which are simultaneously switched between a first pair of servoloops for controlling movement of one of the turrets and a second pair of servoloops for controlling movement of the other turret.

BRIEF DESCRIPTION OF THE DRAWINGS

The foregoing and other objects and features of the present invention will become more apparent upon a consideration of the following description taken in connection with the accompanying drawings wherein.

Figure 1:
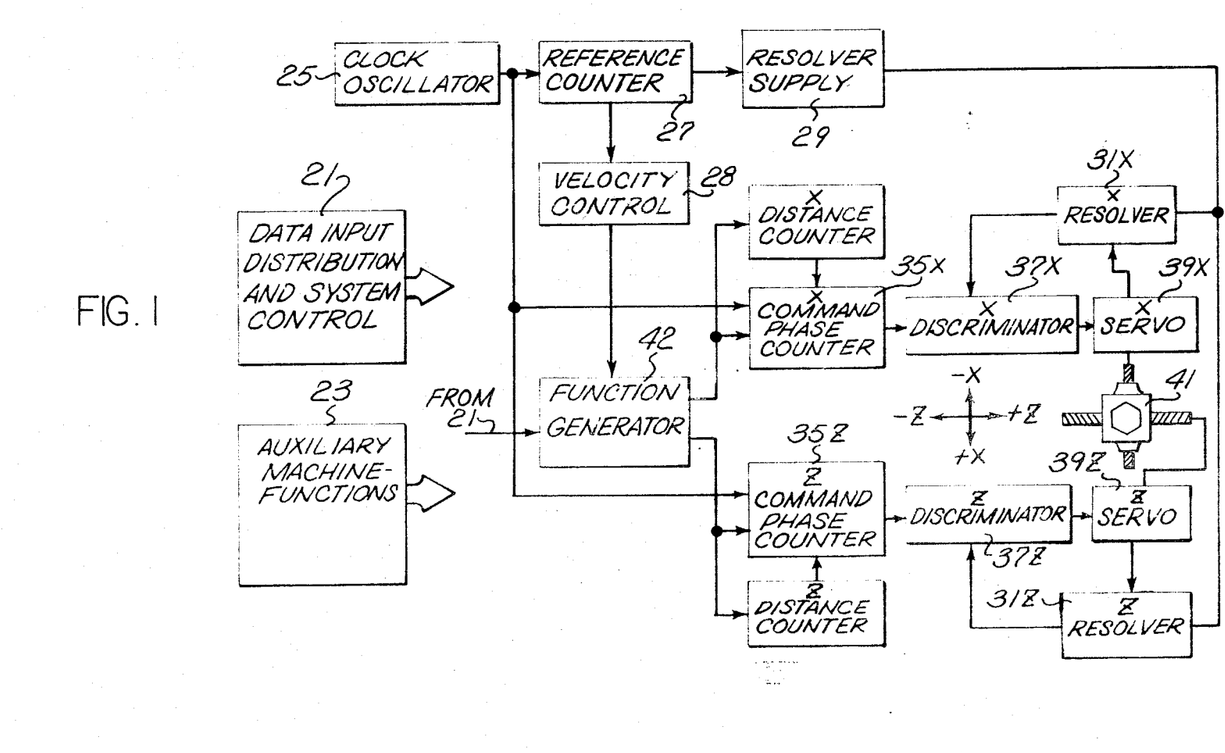
FIG. 1 is a simplified block diagram of a known two-axis control system for a machine tool having a single turret.

In order to provide a background for the description of the present invention, a brief review of a known two-axis control is in order. Although many different two-axis controls are known, FIG. 1 is a simplified block diagram of one known two-axis numerical contouring control for controlling movement of a turret along two orthogonal axes of a machine tool (also see U.S. Pat. No. 3,211,896). The turret is driven along the two axes by phase analog servodrives which respond to the commands generated by the numerical control.

Block 21 represents a tape reader or other source of numerical commands, circuitry for checking the validity of commands, and recognition and distribution circuitry for routing the different commands to their respective registers. In addition to the commands required for controlling movement of the two axes there are commands for selecting spindle speed and direction of rotation, tool station, coolant on or off, etc. Block 23 represents the storage registers, flip-flops, and relay devices for storing these auxiliary commands and providing the proper signals to the machine tool in response to the stored commands. These are all well known in the art and need not be illustrated or described in detail herein. See, for example, instruction books GEK-9068 or GEK-9174 for the 100 S Numerical Control published by The General Electric Company, Specialty Control Department, Waynesboro, Va.

A clock oscillator 25 produces a square wave which may have a frequency of approximately 250 KHz. A reference counter 27 acts as a frequency didvider to produce a plurality of square waves, each having a frequency that is an integral fraction of the clock oscillator frequency. The reference counter 27 has two outputs which may be of different frequencies. One of these outputs is to a velocity control circuit 28 and the other output is to a resolver supply 29. The output from the reference counter 27 to the resolver supply 29 may be, for example, one one-thousandth (1/1000) of the frequency of the clock oscillator, or approximately 250 Hz.

The resolver supply 29 produces two 250 Hz output signals which are 90° out of phase. These signals are used to excite the field windings of two-phase resolvers 31X and 31Z which function as feedback signal generators.

The output of each resolver 31X and 31Z is a 250 Hz signal, the time-phase relationship of which is varied by the position of the resolver rotor. When the rotor of one of the resolvers 31X or 31Z is turned in one direction the time-phase of the resolver output is advanced. When the rotor in the opposite direction, the time-phase of the output is retarded.

The clock oscillator 25 also drives command phase counters 35X and 35Z. The operation of both command phase counters is substantially the same, so only the function of command phase counter 35X will be discussed at length. Command phase counter 35X is similar to reference counter 27. Its lowest frequency output is the same as that of reference counter 27, i.e., one one-thousandth (1/1000) of its input frequency, or approximately 250 Hz.

The 250 Hz output of resolver 31X and command phase counter 35X are connected to an error signal generator or discriminator 37X. Discriminator 37X senses any difference in the time-phase relationship between the signal from resolver 31X and command phase counter 35X and produces a DC signal having a magnitude proportional to the phase difference and a polarity dependent upon whether the signal from the resolver leads or lags the signal from the command phase counter. The output of discriminator 37X provides the input to a servo 39X which drives the X-axis motion of a turret 41 of a single turret lathe. The signals are connected so that whenever a phase difference exists between the output of the command phase counter 35X and the resolver 31X, the discriminator 37X produces a signal that causes the servo to move in the direction that will move the axis and rotate the resolver rotor as to reduce the phase difference.

A function generator 42 is operable to either advance or retard the output of the command phase counter 35X in accordance with commands from the data input 21. To advance the phase of the output signal from the command phase counter 35X, the function generator 42 merely causes one or more pulses to be added to the input from the clock oscillator 25. Similarly, when the phase of the output signal from the command phase counter 35X is to be retarded, the function 42 blocks one or more of the incoming pulses from the clock oscillator.

Assume for the moment that the output of resolver 31X is in phase with the output of command phase counter 25X. Under this condition the output of discriminator 37X will be zero, and there will be no X-axis motion. Next, assume that the input to command phase counter is blocked for a few cycles of the 250 KHz square wave. This will cause the time-phase of the 250 Hz output of command phase counter to lag behind the output of the resolver. This condition causes the discriminator 37X to produce an output, which in turn causes the servo 39X to move the turret 41 along its X-axis and to rotate the rotor of resolver 31X in the direction to retard the time-phase of its output until it is once again in phase with the signal from command phase counter 35X. Adding extra pulses to the 250 KHz input of command phase counter 35X causes the time-phase of its output to be advanced. This condition will result in the servo 39X driving the X-axis in the opposite direction from the above example, again driving the resolver rotor to the position that brings the resolver output in phase with the command phase counter output.

Figure 2:
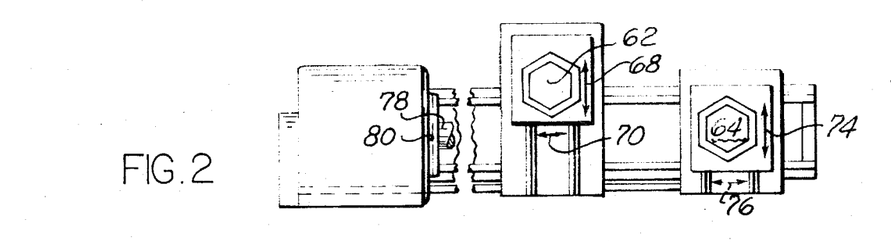
FIG. 2 is a schematic illustration of a machine tool having a pair of turrets each of which is movable relative to a workpiece along an associated pair of axes.

The known control apparatus of FIG. 1 is used in association with a two-axis machine, such as a single turret machine tool. However, many known machines are four-axis machines. Thus, the machine tool 60 of FIG. 2 includes a side turret 62 and an end turret 64 which are each movable along two axes. The side turret 62 is movable along an X-axis 68 and a Z-axis 70. Similarly, the end turret 64 is movable along a U-axis 74 and a W-axis 76. During a maching operation, the turrets 62 and 64 support suitable tools which work on a piece 78 as it is rotated by a spindle 80.

Figure 3:
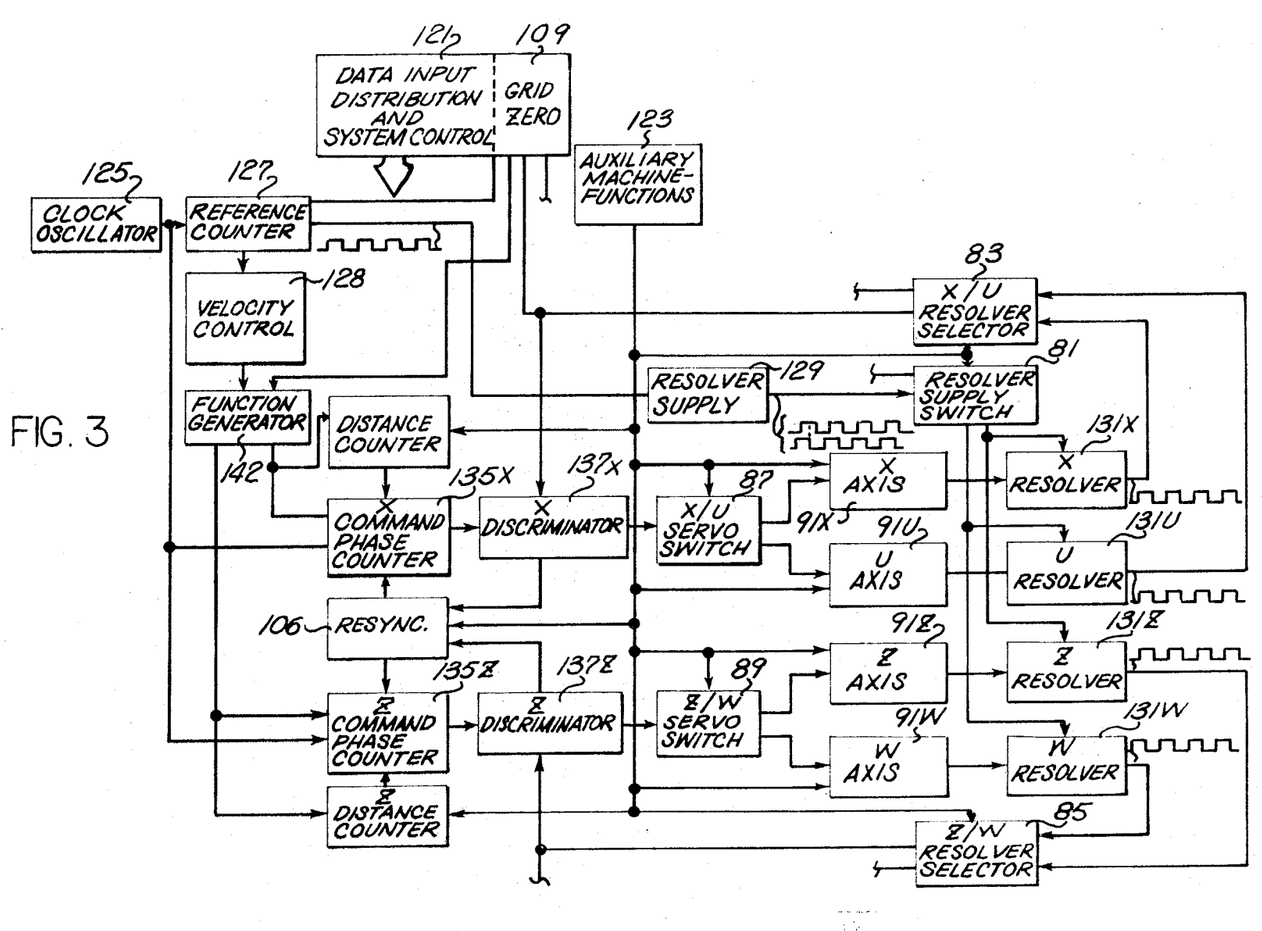
FIG. 3 is a schematic illustration of a control apparatus constructed in accordance with the present invention and utilized in association with the machine tool of FIG. 2.

FIG. 3 is a simplified block diagram of the two-axis numerical contouring control modified according to the present invention to selectively control either the side turret 62 (X and Z axes) or the end turret 64 (U and W axes) of the four-axis turret lathe 60. As in the illustration of FIG. 1, phase-analog servos are employed to drive the axis motions. In order to simplify the description, elements of FIG. 3 are identified by the same reference numerals as in FIG. 1, the numerals of FIG. 3 being increased by 100 to avoid confusion.

MIscellaneous function commands are used to select which turret 62 or 64 is to be controlled. In one illustrative embodiment of the invention, a function command of M24 was used to select the side turret 62 (X and Z axes) and the command M25 to select the end turret 64 (U and W axes). When an M24 (X and Z axis) has been read by the control 121, a resolver supply switch 81 connects the resolver supply 129 to resolvers 131X and 131Z, a resolver selector 83 connects the output of resolver 131x to discriminator 137X, a resolver selector 85 connects the output of resolver 131Z to discriminator 137Z, a servo switch 87 connects the output of discriminator 137X to the X-axis servo 91X and grounds the input to the U-axis servo 91U, and a servo switch 89 connects the output of discriminator 137Z to the Z- axis servo 91Z and grounds the input to the W-axis servo 91W. Under these circuit conditions the side turret (X and Z axes) is active and the end turret (U and W axes) is inactive, i.e., stationary.

When an M25 has clutch/brake read by the control 121, resolver supply switch 81 connects the resolver supply 129 to resolvers 131U and 131W, resolver selector 83 connects the output of resolver 131U to discriminator 137X, resolver selector 85 connects the output of resolver 131W to discriminator 137Z, servo switch 87 connects the output of discriminator 137X to the U-axis servo 91U and grounds the input of the X-axis servo 91X, and servo switch 89 connects the output of discriminator 135Z to the W-axis servo 91W and grounds the input to the Z-axis servo 91Z. Under these circuit conditions, the end turret 64 is active and the side turret 62 is inactive.

Figure 4:
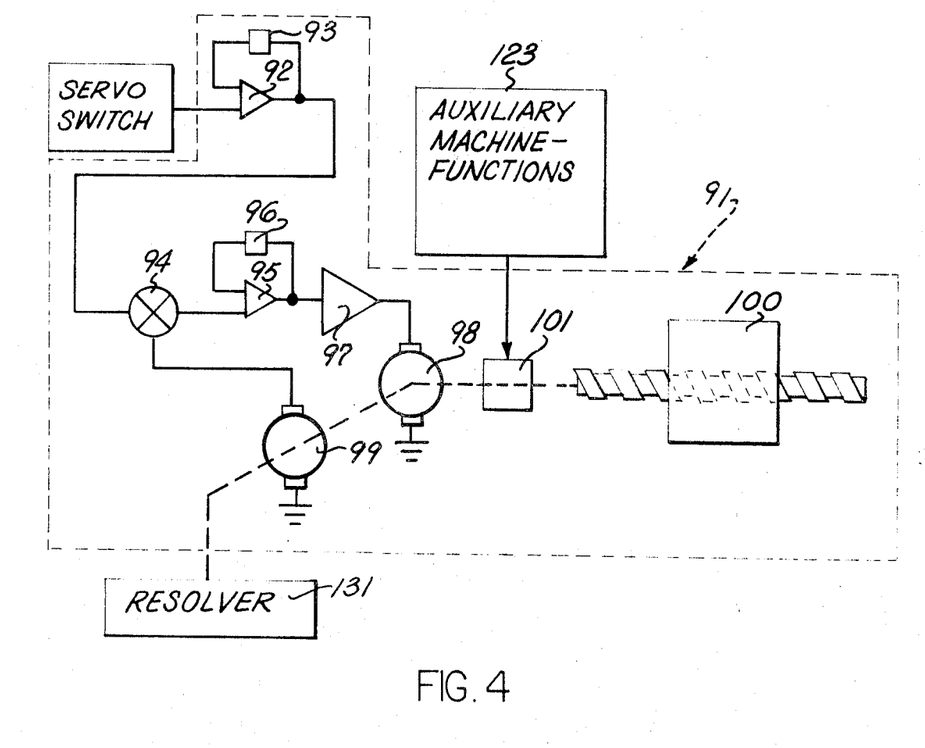
FIG. 4 is a schematic illustration of a portion of the control apparatus of FIG. 3.

In order to simplify FIG. 3 and emphasize the functional relationships of the elements when either an M24 or M25 command has been read by the control, X, U, Z, and W axis servos have been represented by blocks 91X, 91U, 91Z, and 91W. FIG. 4 illustrates, again in schematic form, the parts comprising the identically constructed blocks 91. Each block 91 includes a position error amplifier 92 and compensating network 93, an error signal generator or summing device 94, a velocity loop amplifier 95 and compensating network 96, a power amplifier 97, servomotor 98, and tachometer generator 99. The servomotor 98 drives a ballscrew 100 through a clutch/brake 101 which operates to interconnect the servomotor 98 and ballscrew 100 and release the brake when the axis is active and to disengage the servomotor from the ballscrew and apply the brake to the ballscrew when the axis is inactive. Therefore, the clutch-brake 101 prevents undesired movement of the ballscrew 100 when the associated turret is inactive. The operation and interrelationships of each of these parts are well known to those skilled in the art and need not be described here, it being sufficient to note that when an axis is inactive its position feedback loop (through its resolver and discriminator) is open. In this condition external loading on the ballscrew or amplifier drift in the velocity loop could cause undesired movement in the axis. This is prevented by the clutch/brake 101.

A feature of many commercially available numerical controls, such as that illustrated in FIG. 1, is a turn-on sequence that starts the command phase counters 35X and 35Z in phase with their associated feedback signals. Thus, the initial signal from each discriminator 37X and 37Z is zero, preventing the "jump" that would occur in the servos if the initial signal were non-zero. This feature is utilized in the modified control of the present invention when the turret selection is changed. Under the control of a command circuit, represented by block 121 of FIG. 3 each time the turret selection is changed the command phase counters 135X and 135Z are zeroed and restarted in phase with the feedback signals from the newly selected turret. This prevents the newly selected turret from "jumping" when its position feedback loop is closed.

When a machine operation is to be switched from the turret 62 to the turret 64, the X and Z axes are deactivated and the U and W axes are activated. Considering the switch from the X axis to the U axis, the following steps take place. The brake in the clutch/brake 101 is set in the X axis servo 91X. The X/U servo switch 87 is then opened. Opening the X/U servo switch 87 interrupts or opens the X axis position servoloop which includes the motor 98 in the X axis servo 91X, the resolver or feedback signal generator 131X and discriminator or error signal generator 137X.

At this time a resync circuit 106 blocks signals to the X command phase counter 135X and sets the X command phase counter to zero. Therefore, signals are no longer provided from the X command phase counter 135X to the 137X discriminator.

The resolver supply switch 81 and X/U resolver selector 83 are then switched from an X-axis condition to a U-axis condition. This results in a pair of 90° out of phase signals from the resolver supply 129 being transmitted to the U resolver 131U. Feedback signals are conducted from the U resolver 131U through the resolver selector 83 to the X discriminator 137X. The feedback signals are conducted from the discriminator 137X to the resync circuit 106.

The command phase counter 135X is started in synchronism with the feedback signal from the U resolver 131U by the resync circuit 106. Thus, the X command phase counter 135X starts counting at the trailing edge of a feedback wave signal. Therefore, the signals from the X command phase counter 135X and X discriminator 137X will be in phase. The previously open X/U servo switch is closed to transmit signals to the U axis servo 91U and the brake is released to enable the end turret 64 to be moved along its U axis. During this transition, the system control 121 is placed in a test mode to prevent shutdown due to the presence of an out-of-sync condition.

It should be noted that the X/U servo switch 87, resolver supply switch 81, and X/U resolver selector 83 function to enable the X discriminator or error signal generator 137X to be utilized as a component of either an X-axis position servoloop or a U-axis position servoloop. Thus, switches 81, 83, and 87 function to open one servoloop and complete another servoloop each time a shift is made between the X and U axes. Since the same discriminator or error signal generator 137X is used for both servoloops, the cost of the system for controlling the four-axis machine tool tends to be minimized. However, since the discriminator 137X is switched between the X and U position servoloops, only one of these servoloops can be activated at any given time.

Simultaneously with the previously described switching from the X axis to the U axis, a switching occurs from the Z axis to the W axis. The switching from the Z axis to the W axis is accomplished in the same manner as the switching from the X axis to the U axis. Thus, the clutch/brake is set on the Z axis, and the Z/W servo switch 89 is opened. The Z command phase counter 135Z is started in synchronism with the feedback signal from the W resolver 131W by the resync circuit 106. This results in the Z discriminator 137Z being switched from Z position servoloop to the W position servoloop.

The controls 121 effect the simultaneous switching from the X and Z axes to the U and W axes so that the turret 64 can be moved along both the U and W axes while the turret 62 is parked or stationary. Similarly, the controls 121 effect a simultaneous switching from U and W axes to the X and Z axes to enable the turret 62 to be moved along both the X and Z axes while the turret 64 is parked or stationary.

Regardless of which turret 62 or 64 is being moved, the function generator 142 is operated in accordance with commands from the data input controls 121 to either retard or advance the phase of the output signals from the X and Z command phase counters 135X and 135Z. This results in the generation of error signals by the X and Z discriminators 137X and 137Z in the manner previously explained in connection with the prior art control system of FIG. 1.

Opening the position feedback loop each time an axis is made inactive provides a condition wherein small positioning errors find their way into the system. This can happen because the system resolution is not zero, but is some small finite distance. The command phase signal and the feedback signal have a frequency of 250 Hz. In the illustrative system, each resolver makes one full revolution for each 0.1 inch of axis travel. Since one full revolution of a resolver shifts the feedback signal one full cycle forward or backward in time, one full cycle of the 250 Hz signal represents 0.1 inch of axis motion. Because the reference frequency is 250 KHz, the 250 Hz signal from the command phase counters can be shifted forward or backward in time a minimum of one cycle of the 250 KHz reference frequency, or 0.001 cycle of the 250 Hz signal. Thus, the electrical resolution of the system can be no better than 0.001 × 0.1 inch = 0.0001 inches. When small non-linearities in the resolvers and mechanical backlash are taken into consideration, the system overall resolution is approximately 0.0002 inches.

Assume now that the control is turned on and the end turret (U and W axes) is selected. On turn-on, system control 121 starts the command phase counters 135X and 135Z in phase with the output signals of resolvers 131U and 131W, respectively. As noted above, this is a standad feature of commercially available controls and is provided so that the axis motions do not "jump" when the control is turned on. Thus, immediately after turn-on, the outputs of discriminators 137X and 137Z are zero. Now assume that the function generator 142, in response to a command, shifts the phase of the output of command phase counter 135X forward 250 cycles of the 250 KHz reference frequency, or ¼ cycle of the 250 Hz command and feedback frequency. The U-axis servo will respond to the resulting signal from discriminator 137X and move the U-axis 0.0250 ± 0.0002 inches (0.0002 inch is the system resolution). In a conventional system this causes no difficulty because the position loop remains closed. Therefore, the positioning error will never be greater than ±0.0002 inch. In the present system, however, it is possible for a larger positioning error to accumulate. Suppose, for example, the U-axis is actually moved 0.0250 − 0.0002 inches, or 0.0248 inches, instead of the commanded distance of 0.0250 inch. Now, if the side turret 62 is selected, the U-axis position feedback loop will be opened. When the end turret 64 is again selected, its position loops will be closed and the command phase counters 135X and 135Z zeroed and restarted in phase with the feedback signals from resolvers 131U and 131W, respectively. Restarting command phase counter 135X in phase with the signal from resolver 131U may result in either a 0.0001 inch or a 0.0002 inch positioning error. Statistically, the errors generated by axis switching would be self-cancelling if the motions commanded just before switching were randomly distributed. However, these motions tend to follow a pattern, e.g., moving the turret to the same out-of-the-way location each time it is parked. Thus, the positioning errors due to opening the position feedback loop will accumulate. This accumulation of error provides no problem during the machining of a part because selectable offsets may easily be used to dial in necessary corrections. Also, successive identical parts machined from the same part program will accumulate the same positioning errors at each step of the operation. Thus, it is necessary only to eliminate these positioning errors once each time a new workpiece is loaded into the machine. Each time a new workpiece is loaded into the machine 60, the machine is zeroed to eliminate positioning errors. To accomplish this, a signal is transmitted to the X command phase counter 135X to cause the side turret 62 to move to a grid zero position in which the feedback signal from the X resolver 131X should be in phase with the reference signal from the reference counter 127. With the illustrated machine, this would occur at every whole tenth (0.1000) of an inch. Once the turret is moved to a grid zero position, a grid zero control 109 compares the feedback signal from the X resolver 131X with the reference signal. If no errors have accumulated during the switching, these signals will match. However, in all probability, some small error will have accumulated and the signals will not be in phase. When this occurs, the grid zero control 109 transmits signals to the function generator 142 to either advance or retard the signal from the X phase command counter 135X to the X discriminator 137X to effect operation of the X servomotor in the manner previously explained until the feedback signal from the X resolver 131X is in phase with the signal from the reference counter 127.

The Z axis is zeroed simultaneously with the zeroing of the X axis. Thereafter, the U and W axes are zeroed. It should be noted that the clutch/brake units 101 hold the servomotors 98 when the servoloops are opened to prevent the positioning error from becoming excessive each time a servoloop is opened.

From the foregoing description it is apparent that the present invention enables a two-axis control (FIG. 3) to be selectively used to control one turret at a time of a two-turret machine 60. By utilizing a two-axis control to selectively control either axis pair of a four axis (X, Z, U and W) machine tool, the present invention reduces the cost of the controls. This is accomplished by utilizing many of the control elements to control movment of one turret along one of its two axes and to control movement of the other turret along one of its two axes.

Accordingly, the error signal generator or discriminator 137X is connected in either the X position servoloop or the U position servoloop depending upon whether the side turret 62 or end turret 64 is to be moved. When the X discriminator 137X is switched from the servoloop controlling movement of the side turret 62 to the U servoloop controlling the end turret 64, the Z error signal generator or discriminator 137Z is switched from the Z position servoloop for controlling movement of the side turret 62 relative to its Z-axis to the W position servoloop with for controlling movement of the end turret 64 relative to its W-axis. Since the error signal generators 137X and 137Z are simultaneously switched between servoloops associated with the side turret 62 and servoloops associated with the end turret 64, only one of the two turrets can be moved at a time. Although the controls of the present invention are described herein as being phase analog servo-controls used in connection with a two-turret machine tool, it is contemplated that the controls may be of the digital type and may be utilized in other environments.

Having described a specific preferred embodiment of the invention, the following is claimed:

1. An apparatus comprising first tool support means for moving a first tool toward and away from a workpiece along a first axis and for moving the first tool toward and away from the workpiece along a second axis which extends transversely to said first axis, second tool support means for moving a second tool toward and away from the workpiece along a third axis and for moving the second tool toward and away from the workpiece along a fourth axis which extends transversely to said third axis, first and second motor means each of which is associated with one of said first and second axes and is operable to move said first tool support means along the associated one of said first and second axes, third and fourth motor means each of which is associated with one of said third and fourth axes and is operable to move said second tool support means along the associated one of said third and fourth axes, control means for effecting movement of only one of said tool support means at a time and for preventing movement of the other tool support means during movement of the one tool support means, said control means including first feedback signal generator means for providing signals during movement of said first tool support means along said first axis under the influence of said first motor means, second feedback signal generator means for providing signals during movement of said first tool support means along said second axis under the influence of said second motor means, third feedback signal generator means for providing signals during movement of said second tool support means along said third axis under the influence of said third motor means, fourth feedback signal generator means for providing signals during movement of said second tool support means along said fourth axis under the influence of said fourth motor means, first means for providing command signals which are associated with said first axis during movement of said first tool support means and which are associated with said third axis during movement of said second tool support means, second means for providing command signals which are associated with said second axis during movement of said first tool support means and which are associated with said fourth axis during movement of said second tool support means, first error signal generator means for receiving signals from said first means for providing command signals, from said first feedback signal generator means, and from said third feedback signal generator means, for effecting operation of said first motor means as a function of the command signals from said first means and the signals from said first feedback signal generator means when said third and fourth means are in inactive conditions, and for effecting operation of said third motor means as a function of the command signals from said first means and the signals from said third feedback signal generator means when said first and second motor means are in inactive conditions, second error signal generator means for receiving signals from said second means for providing command signals, from said second feedback signal generator means, and from said fourth feedback signal generator means, for effecting operation of said second motor means as a function of the command signals from said second means and the signals from said second feedback signal generator means when said third and fourth motor means are in inactive conditions, and for effecting operation of said fourth motor means as a function of the command signals from said second means and the signals from said fourth feedback signal generator means when said first and second motor means are in inactive conditions, and means for rendering said first and second error signal generator means ineffective to operate either of said first and second motor means during operation of either of said third and fourth motor means and for rendering said first and second error signal generator means ineffective to operate either of said third and fourth motor means during operation of either of said first and second motor means.

2. An apparatus as set forth in claim 1 further including first brake means operable between an engaged condition holding said first tool support means against movement along said first axis and a disengaged condition enabling said first tool support means to be moved under the influence of said first motor means, second brake means operable between an engaged condition holding said first tool support means against movement along said second axis and a disengaged condition enabling said first tool support means to be moved under the influence of said second motor means, third brake means operable between an engaged condition holding said second tool support means against movement along said third axis and a disengaged condition enabling said second tool support means to be moved under the influence of said third motor means, and fourth brake means operable between an engaged condition holding said second tool support means against movement along said fourth axis and a disengaged condition enabling said second tool support means to be moved under the influence of said fourth motor means, said control means including means for effecting operation of said first and second brake means from the engaged condition to the disengaged condition only when said third and fourth brake means are in the engaged condition and for effecting operation of said third and fourth brake means from the engaged condition to the disengaged condition only when said first and second brake means are in the engaged condition.

3. An apparatus as set forth in claim 1 wherein said first and second means for providing command signals each include means for producing a cyclically repetitive command wave form and means for advancing and retarding the phase of said cyclically repetitive command wave form, each of said feedback signal generator means including means for producing a cyclically repetitive feedback wave form and means for advancing and retarding the phase of said feedback wave form as a function of movement of the associated one of said tool support means along the associated one of said axes, each of said error signal generator means including means for generating an output signal which varies as a function of variations in the phase relationship between an associated one of said command wave forms and one of said feedback wave forms.

4. An apparatus as set forth in claim 1 further including circuit means for connecting said first motor means, first feedback signal generator means and first error signal generator means in a first servoloop and for connecting said third motor means, third feedback signal generator means and first error signal generator means in a second servoloop, said circuit means including switch means operable between a first condition opening said first servoloop and completing said second servoloop and a second condition opening said second servoloop and completing said first servoloop.

5. A machine tool comprising spindle means for rotating a workpiece about an axis of rotation, first tool support means for moving a first tool toward and away from said spindle means along a first axis and for moving the first tool toward and away from said axis of rotation along a second axis which extends transversely to said first axis, second tool support means for moving a second tool toward and away from spindle means along a third axis and for moving the second tool toward and away from said axis of rotation along a fourth axis which extends transversely to said third axis, first and second motor means each of which is associated with one of said first and second axes and is operable to move said first tool support means along the associated one of said first and second axes, third and fourth motor means each of which is associated with one of said third and fourth axes and is operable to move said second tool support means along the associated one of third and fourth axes, control means for effecting movement of only one of said tool support means at a time and for preventing movement of the other tool support means during movement of the one tool support means, said control means including switching means for maintaining said first and second motor means in an inactive condition at all times during operation of either of said third and fourth motor means and for maintaining said third and fourth motor means in an inactive condition at all times during operation of either of said first and second motor means.

6. A machine tool as set forth in claim 5 wherein said control means further includes first and second error signal generators, first circuit means for interconnecting said first error signal generator, switch means, and first motor means to form a first servoloop, second circuit means for interconnecting said first error signal generator, switch means, and third motor means to form a second servoloop, third circuit means for interconnecting said second error signal generator, switch means, and second motor means to form a third servoloop, and fourth circuit means for interconnecting said second signal generator, switch means, and third motor means to form a fourth servoloop, said switch means being operable between first and second conditions, said switch means being operable in said first condition to complete said first and third servoloops and to open said second and fourth servoloops to enable said first and second motor means to be activated to move said first tool support means relative to said first and second axes and to maintain said third and fourth motor means in an inactive condition, said switch means being operable in said second condition to complete said second and fourth servoloops and to open said first and third servoloops to enable said third and fourth motor means to be activated to move said second tool support means relative to said third and fourth axes and to maintain said first and second motor means in an inactive condition.

7. A machine tool as set forth in claim 6 further including first and second brake means for holding first tool support means against movement along said first and second axes when said switch means is in said second condition, and third and fourth brake means for holding said second tool support means against movement along said third and fourth axes when said switch means is in said first condition.

8. A machine tool comprising first tool support means for moving a first tool toward and away from a workpiece along a first axis and for moving the first tool toward and away from the workpiece along a second axis which extends transversely to said first axis, second tool support means for moving a second tool toward and away from the workpiece along a third axis and for moving the second tool toward and away from the workpiece along a fourth axis which extends transversely to said third axis, first and second motor means each of which is associated with one of said first and second axes and is operable to move said first tool support means along the associated one of said first and second axes, third and fourth motor means each of which is associated with one of said third and fourth axes and is operable to move said second tool support means along the associated one of third and fourth axes, first feedback signal generator means for generating feedback signals during operation of said first motor means, second feedback signal generator means for generating feedback signals during operation of said second motor means, third feedback signal generator means for generating feedback signals during operation of said third motor means, fourth feedback signal generator means for generating feedback signals during operation of said fourth motor means, first and second error signal generators, first circuit means for interconnecting said first error signal generator, first feedback signal generator means, and first motor means to form a first servoloop, second circuit means for interconnecting said first error signal generator, third feedback signal generator means, and third motor means to form a second servoloop, first switch means operable between a first condition completing said first servoloop and opening said second servoloop and a second condition completing said second servoloop and opening said first servoloop, third circuit means for interconnecting said second error signal generator, second feedback signal generator means, and second motor means to form a third servoloop, fourth circuit means for interconnecting said second signal generator, third feedback signal generator means, and fourth motor means to form a fourth servoloop, and second switch means operable between a first condition completing said third servoloop and opening said fourth servoloop and a second condition completing said fourth servoloop and opening said third servoloop.

9. A machine tool as set forth in claim 8 further including first and second brake means for holding first tool support means against movement along said first and second axes when said first and second switch means are in said second condition, and third and fourth brake means for holding said second tool support means against movement along said third and fourth axes when said first and second switch means is in said first condition.

10. An apparatus as set forth in claim 1 further including circuit means for connecting said first motor means, first feedback signal generator means and first error signal generator means in a first servoloop and for connecting said third motor means, third feedback signal generator means and first error signal generator means in a second servoloop, said circuit means including switch means operable between a first condition completing said second servoloop and a second condition completing said first servoloop.

11. A machine tool comprising first tool support means for moving a first tool toward and away from a workpiece along a first axis and for moving the first tool toward and away from the workpiece along a second axis which extends transversely to said first axis, second tool support means for moving a second tool toward and away from the workpiece along a third axis and for moving the second tool toward and away from the workpiece along a fourth axis which extends transversely to said third axis, first and second motor means each of which is associated with one of said first and second axes and is operable to move said first tool support means along the associated one of said first and second axes, third and fourth motor means each of which is associated with one of said third and fourth axes and is operable to move said second tool support means along the associated one of third and fourth axes, first feedback signal generator means for generating feedback signals during operation of said first motor means, second feedback signal generator means for generating feedback signals during operation of said second motor means, third feedback signal generator means for generating feedback signals during operation of said third motor means, fourth feedback signal generator means for generating feedback signals during operation of said fourth motor means, first and second error signal generators, first circuit means for interconnecting said first error signal generator, first feedback signal generator means, and first motor means to form a first servoloop, second circuit means for interconnecting said first error signal generator, third feedback signal generator means, and third motor means to form a second servoloop, first switch means operable between a first condition completing said first servoloop and a second condition completing said second servoloop, third circuit means for interconnecting said second error signal generator, second feedback signal generator means, and second motor means to form a third servoloop, fourth circuit means for interconnecting said second signal generator, third feedback signal generator means, and fourth motor means to form a fourth servoloop, and second switch means operable between a first condition completing said third servoloop and a second condition completing said fourth servoloop.

* * * * *